Joseph Hilsenrath
Samuel Globe

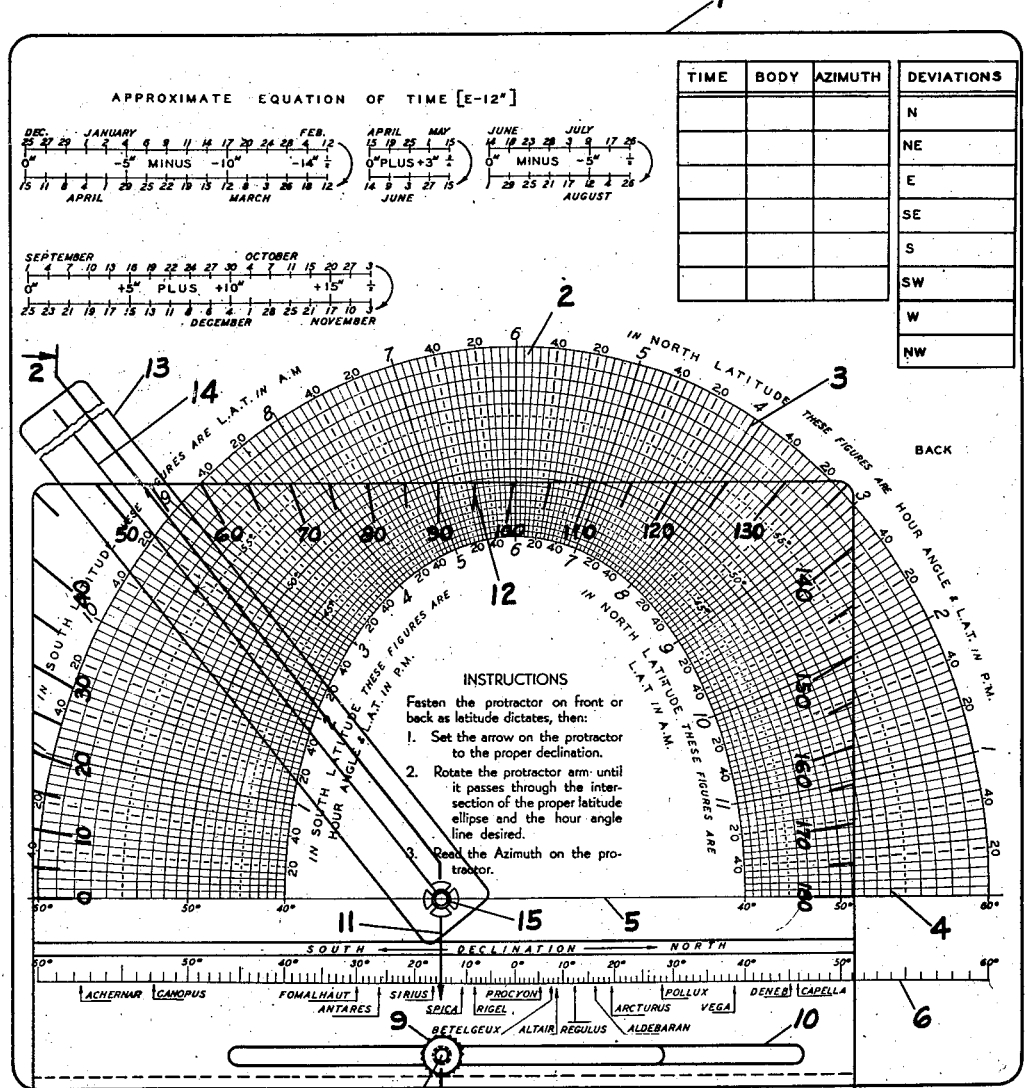

Patented Oct. 8, 1946

2,408,776

UNITED STATES PATENT OFFICE 2,408,776

AZIMUTH COMPUTER

Joseph Hilsenrath and Samuel Globe,
United States Navy

Application March 20, 1945, Serial No. 583,823

13 Claims. (Cl. 33—1)

(Granted under the act of March 3, 1883, as amended April 30, 1928; 370 O. G. 757)

This invention relates generally to navigation instruments, and particularly to devices for solving spherical triangles.

In the art of navigation it is a constantly recurring problem to solve spherical triangles for one angle when others are known. Compass adjusters must frequently determine azimuth of some celestial body for purpose of checking the indication of the compass under observation.

It is common practice in such cases to start with such factors as hour angle, latitude of the observer and declination of the observed body, and determine its azimuth by reference to various tables, charts, etc. A compass adjuster will often have a number of azimuth cards or curves calculated for certain locations.

In these various determinations of azimuth, interpolations are often necessary, and the calculations are such that an error early in the process may be multiplied as the calculation proceeds, leading to errors of intolerable magnitude.

At best the calculations are tedious and time consuming. There is a need for some means for determining azimuths rapidly and with a minimum chance for errors such as are common in the ordinary methods used.

It is, therefore, an object of the invention to provide a simple and practical device capable of facile and rapid determinations of azimuth, when local apparent time or hour angle, latitude and declination are known.

It is an object to provide a device sufficient in itself for accurate solution of spherical triangles, avoiding any need for reference to bulky volumes of azimuth tables, etc.

A further object of our invention is to provide an azimuth computer which will give true azimuths.

Additional objects will appear when the description is considered.

In the drawings:

Figure 1 is a representation of a preferred form of our azimuth computer, showing the protractor mounted on the reverse side of the base.

Figure 2 is a section along line 2—2 of Figure 1.

Figure 3:
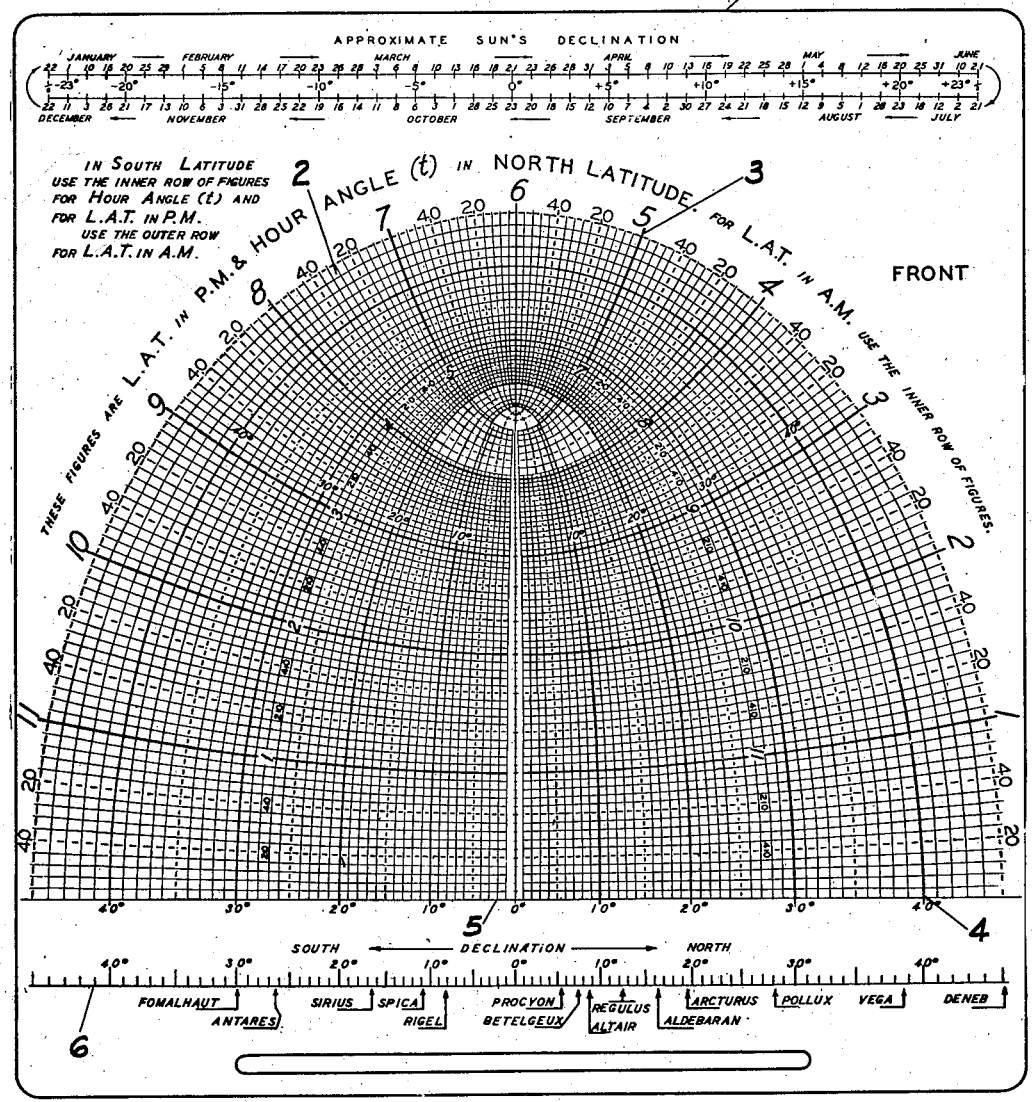
Figures 4, 5:
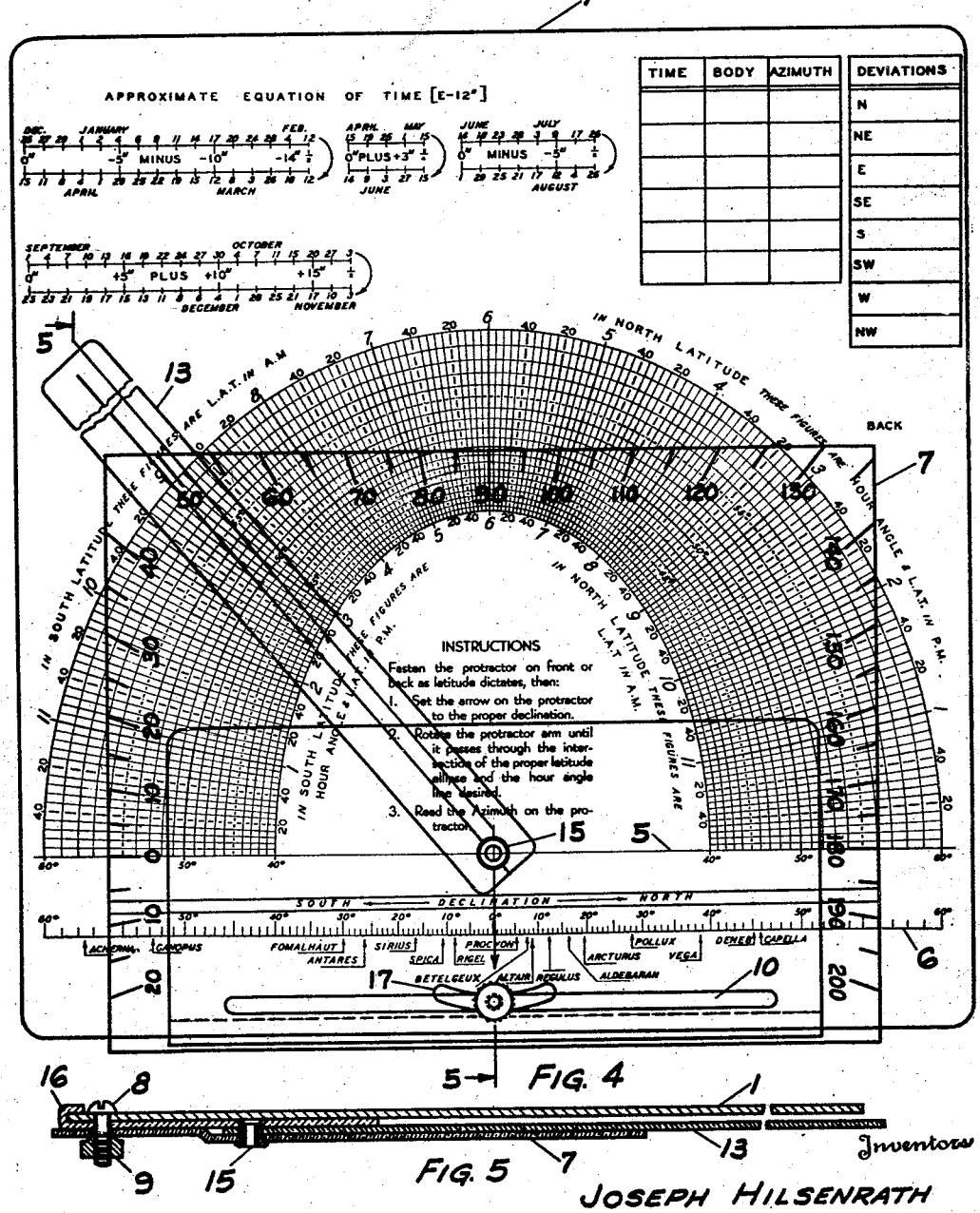

Figure 3 indicates the obverse side of the base only of the computer.

As indicated in Figure 1, our azimuth computer includes an opaque base 1 on which is printed or otherwise suitably marked a grid 2. The grid is composed of hour angle hyperbolas 3 and latitude ellipses 4 in suitable increments. The line 5, which we term the axis of the grid, is an axis of the confocal hyperbolas and ellipses, and is parallel to the lower edge of the base 1.

Hyperbolas 3 are numbered inside and outside the grid. Latitude ellipses 4 are numbered along the axis 5. Since the latitude ellipses also serve to measure declination, the indications along axis 5 are brought down and repeated at scale 6 for convenience in operation.

The difference in the grids on front and back of the base is only in the scope of latitudes covered. On the back are marked ellipses for latitudes of from 40° to 60°, while latitudes of 0° to 45° are marked on the front side. Front and back grids will be registered so that the protractor may be used on either side.

Mounted for sliding parallel to the axis 5 is a protractor 7 of transparent material. A bolt 8 with nut 9 fits through the protractor and may slide in a slot 10 cut through base 1 parallel to the axis 5 and to the bottom edge of the base. In the form shown the lower edge of the protractor is bent around the lower edge of the base to assist in holding the protractor in proper relation to the base. Its scale is indicated at 12.

Protractor arm 13 with its index line 14 is pivoted at 15 to the protractor in such fashion that the pivot 15 lies directly over axis 5 when the protractor is mounted on the base. A line 11 is marked on the protractor projecting vertically downward from the pivot point for reading against the scale 6.

It will be apparent that the protractor may be slid along the base with pivot 15 following axis 5 and that declination may be read by consideration of line 11 relative to scale 6. Position of index line 14 will be read on suitable scales on the outer edges of the protractor. In order that the device may be used for North and South latitudes and for any hour angle or local apparent time, the various scales will be suitably numbered and full directions marked explaining operation. Not all the markings employed are shown to avoid confusing detail.

The theory of the device is as follows:

In the grid 2, latitude ellipses $l$ are defined by the equation $$\frac{x^2}{\sec^2 l} + \frac{y^2}{\tan^2 l} = 1$$

Hour angle hyperbolas $h$ are defined by the equation $$\frac{x^2}{\sin^2 h} - \frac{y^2}{\cos^2 h} = 1$$

Systems of latitude ellipses and hour angle hyperbolas are marked on $x$ and $y$ coordinate axes. The intersection of a latitude ellipse with an hour angle hyperbola defines a point A whose coordinates are:

$$x = \sec l \sin h$$
$$y = \tan l \cos h$$

If from a point B on the $y$ axis with coordinates $$x = 0$$
$$y = \tan d$$

where $d$=declination, a line AB be drawn, such line will form with the $y$ axis an angle $a$ which represents the azimuth of a body of declination $d$ from latitude $l$ at hour angle $h$.

The device described has been designed to solve this system mechanically. In the grid 2 the line 5 corresponds to the $y$ coordinate axis.

In operation, to determine azimuth of a given body, with declination, hour angle, and latitude known, the first step is to mount the protractor on front or back of the base 1, as dictated by latitude. The protractor will then be secured by tightening nut 9 in such position that line 11 crosses scale 6 at the proper declination. Arm 13 will then be moved to locate line 14 at the intersection of the ellipse and hyperbola representing the known latitude and hour angle. Line 14 will then indicate on the scale of the protractor the azimuth, commonly referred to as $Zn$.

In Figure 1, the instrument is set to determine azimuth when:

Latitude=56° S.
Declination=15° S.
Hour angle=$2^h36^m$ E.

Azimuth reads on protractor 7 as 0510.8.

As is apparent, the entire problem is solved by the one instrument. There is no need for reference to any books or charts. To facilitate this operation, directions and rules may be printed on the device. Some are shown, others omitted for clarity of illustration. The computer may be used for any latitude or declination to 60° either north or south. Azimuth is found directly as $Zn$.

Obviously many changes are permissible while adhering to the principles of the invention as expressed in the following claims.

The invention described herein may be manufactured and used by or for the Government of the United States of America for governmental purposes without the payment of any royalties thereon or therefor.

We claim:

1. In an azimuth computer, a base member comprising a grid composed of confocal hour angle hyperbolas and latitude ellipses, said base member having a plurality of bearing surfaces parallel to the minor axis of the ellipses, a protractor member mounted on the base member, said protractor member having means cooperating with and engaging said bearing surfaces, whereby said protractor member is slidably but non-rotatably moveable parallel to said minor axis.

2. In an azimuth computer, a base member comprising a grid composed of confocal hour angle hyperbolas and latitude ellipses, said base member having a plurality of bearing surfaces parallel to the minor axis of the ellipses, a protractor member mounted on the base member, said protractor member having means cooperating with and engaging said bearing surfaces, whereby said protractor member is slidably but non-rotatably moveable parallel to said minor axis, and an arm pivoted on the protractor, at a point coinciding with said minor axis whereby the pivot may move along said minor axis.

3. In an azimuth computer, a base member comprising a grid composed of confocal hour angle hyperbolas and latitude ellipses, said base member having a plurality of bearing surfaces parallel to the minor axis of the ellipses, a protractor member mounted on the base member, said protractor member having means cooperating with and engaging said bearing surfaces, whereby said protractor member is slidably but non-rotatably moveable parallel to said minor axis, and an arm pivoted on the protractor, at a point coinciding with said minor axis whereby the pivot may move along said minor axis, said bearing surfaces and said cooperating and engaging means including an edge on one of said members parallel to said minor axis and a lip on the other of said members bearing against and engaging with said edge.

4. In an azimuth computer, a base member comprising a grid composed of confocal hour angle hyperbolas and latitude ellipses, said base member having a plurality of bearing surfaces parallel to the minor axis of the ellipses, a protractor member mounted on the base member, said protractor member having means cooperating with and engaging said bearing surfaces, whereby said protractor member is slidably but non-rotatably moveable parallel to said minor axis, and an arm pivoted on the protractor, at a point coinciding with said minor axis whereby the pivot may move along said minor axis, said bearing surfaces and said cooperating and engaging means including a slot in at least one of said members and a threaded bearing pin and locking nut in the other of said members.

5. In an azimuth computer, a base member comprising a grid composed of confocal hour angle hyperbolas and latitude ellipses, said base member having a plurality of bearing surfaces parallel to the minor axis of the ellipses, a protractor member mounted on the base member, said protractor member having means cooperating with and engaging said bearing surfaces, whereby said protractor member is slidably but non-rotatably moveable parallel to said minor axis, and an arm pivoted on the protractor, at a point coinciding with said minor axis whereby the pivot may move along said minor axis, said bearing surfaces and said cooperating and engaging means including an edge on one of said members parallel to said minor axis and a lip on the other of said members bearing against and engaging with said edge, and a slot in at least one of said members and a threaded bearing pin and locking nut in the other of said members.

6. In an azimuth computer, a base member comprising a grid composed of confocal hour angle hyperbolas and latitude ellipses, said base member having a plurality of bearing surfaces parallel to the minor axis of the ellipses, a protractor member mounted on the base member, said protractor member having means cooperating with and engaging said bearing surfaces, whereby said protractor member is slidably but non-rotatably moveable parallel to said minor axis, and an arm pivoted on the protractor, at a point coinciding with said minor axis whereby the pivot may move along said minor axis, said bearing surfaces and said cooperating and engaging means including an edge on one of said members parallel to said minor axis and a lip on the other of said members bearing against and engaging with said edge, and a slot in at least one of said members and a threaded bearing pin and locking nut in the other of said members, the declination axis being duplicated below the minor axis, an indicator means on said protractor member reading on said duplicate declination axis, an indicator means on said protractor arm comprising a line extending from the pivot, said protractor member being offset between said duplicate declination axis and said minor axis, said protractor arm being pivoted to the bottom of said protractor member between said protractor member and said base member with said indicator means closely adjacent the base member thereby avoiding parallax between said indicator means and said grid.

7. In an azimuth computer, a base member comprising a grid composed of confocal hour angle hyperbolas and latitude ellipses, said base member having a plurality of bearing surfaces parallel to the minor axis of the ellipses, a protractor member mounted on the base member, said protractor member having means cooperating with and engaging said bearing surfaces, whereby said protractor member is slidably but non-rotatably moveable parallel to said minor axis, and an arm pivoted on the protractor, at a point coinciding with said minor axis whereby the pivot may move along said minor axis, the declination axis being duplicated below the minor axis, an indicator means on said protractor member reading on said duplicate declination axis, an indicator means on said protractor arm comprising a line extending from the pivot, said protractor member being offset between said duplicate declination axis and said minor axis, said protractor arm being pivoted to the bottom of said protractor member between said protractor member and said base member with said indicator means closely adjacent the base member thereby avoiding parallax between said indicator means and said grid.

8. In an azimuth computer, a base member comprising a grid composed of confocal hour angle hyperbolas and latitude ellipses, said base member having a plurality of bearing surfaces parallel to the minor axis of the ellipses, a protractor member mounted on the base member, said protractor member having means cooperating with and engaging said bearing surfaces, whereby said protractor member is slidably but non-rotatably moveable parallel to said minor axis, said bearing surfaces and said cooperating and engaging means including an edge on one of said members parallel to said minor axis and a lip on the other of said members bearing against and engaging with said edge.

9. In an azimuth computer, a base member comprising a grid composed of confocal hour angle hyperbolas and latitude ellipses, said base member having a plurality of bearing surfaces parallel to the minor axis of the ellipses, a protractor member mounted on the base member, said protractor member having means cooperating with and engaging said bearing surfaces, whereby said protractor member is slidably but non-rotatably moveable parallel to said minor axis, said bearing surfaces and said cooperating and engaging means including a slot in at least one of said members and a threaded bearing pin and locking nut in the other of said members.

10. In an azimuth computer, a base member comprising a grid composed of confocal hour angle hyperbolas and latitude ellipses, said base member having a plurality of bearing surfaces parallel to the minor axis of the ellipses, a protractor member mounted on the base member, said protractor member having means cooperating with and engaging said bearing surfaces, whereby said protractor member is slidably but non-rotatably moveable parallel to said minor axis, said bearing surfaces and said cooperating and engaging means including an edge on one of said members parallel to said minor axis and a lip on the other of said members bearing against and engaging with said edge, a slot in at least one of said members and a threaded bearing pin and locking nut in the other of said members.

11. In an azimuth computer, a reversible base member comprising a grid composed of confocal hour angle hyperbolas and latitude ellipses, the grid on one side of said base member being a continuation of and registered with the grid on the other side thereof, said base member having a plurality of bearing surfaces parallel to the minor axis of the ellipses, a protractor member mounted on the base member, said protractor member having means cooperating with and engaging said bearing surfaces, whereby said protractor member is slidably but non-rotatably moveable parallel to said minor axis.

12. In an azimuth computer, a reversible base member comprising a grid composed of confocal hour angle hyperbolas and latitude ellipses, the grid on one side of said base member being a continuation of and registered with the grid on the other side thereof, said base member having a plurality of bearing surfaces parallel to the minor axis of the ellipses, a protractor member mounted on the base member, said protractor member having means cooperating with and engaging said bearing surfaces, whereby said protractor member is slidably but non-rotatably moveable parallel to said minor axis, said bearing surfaces and said cooperating and engaging means including an edge on one of said members parallel to said minor axis and a lip on the other of said members bearing against and engaging with said edge, and a slot in at least one of said members and a threaded bearing pin and locking nut in the other of said members enabling said protractor member to be slidably but non-rotatably secured on either side of said base member.

13. In an azimuth computer, a reversible base member comprising a grid composed of confocal hour angle hyperbolas and latitude ellipses, the grid on one side of said base member being a continuation of and registered with the grid on the other side thereof, said base member having a plurality of bearing surfaces parallel to the minor axis of the ellipses, a protractor member mounted on the base member, said protractor member having means cooperating with and engaging said bearing surfaces, whereby said protractor member is slidably but non-rotatably moveable parallel to said minor axis, and an arm pivoted on the protractor, at a point coinciding with said minor axis whereby the pivot may move along said minor axis, said bearing surfaces and said cooperating and engaging means including an edge on one of said members parallel to said minor axis and lip on the other of said members bearing against and engaging with said edge, and a slot in at least one of said members and a threaded bearing pin and locking nut in the other of said members enabling said protractor member to be slidably but non-rotatably secured on either side of said base member, the declination axis being duplicated below the minor axis, an indicator means on said protractor member reading on said duplicate declination axis, an indicator means on said protractor arm comprising a line extending from the pivot, said protractor member being offset between said duplicate declination axis and said minor axis, said protractor arm being pivoted to the bottom of said protractor member between said protractor member and said base member with said indicator means closely adjacent the base member thereby avoiding parallax between said indicator means and said grid.

JOSEPH HILSENRATH.
SAMUEL GLOBE.